(12) United States Patent
Shum et al.

(10) Patent No.: US 11,154,824 B2
(45) Date of Patent: Oct. 26, 2021

(54) SYSTEM AND METHOD FOR GENERATION OF EMULSIONS WITH LOW INTERFACIAL TENSION AND MEASURING FREQUENCY VIBRATIONS IN THE SYSTEM

(71) Applicant: VERSITECH LIMITED, Hong Kong (CN)

(72) Inventors: Ho Cheung Shum, Hong Kong (CN); Alban Sauret, Vallabregues (FR); Zida Li, Yuncheug (CN); Yang Song, Linyi (CN)

(73) Assignee: VERSITECH LIMITED, Hong Kong (CN)

( * ) Notice: Subject to any disclaimer, the term of this patent is extended or adjusted under 35 U.S.C. 154(b) by 98 days.

(21) Appl. No.: 16/109,626

(22) Filed: Aug. 22, 2018

(65) Prior Publication Data

US 2018/0361328 A1    Dec. 20, 2018

Related U.S. Application Data

(62) Division of application No. 13/839,072, filed on Mar. 15, 2013, now Pat. No. 10,080,997.

(Continued)

(51) Int. Cl.
*B01F 3/08* (2006.01)
*B01F 13/00* (2006.01)
(Continued)

(52) U.S. Cl.
CPC .......... *B01F 3/0819* (2013.01); *B01F 3/0807* (2013.01); *B01F 13/0062* (2013.01);
(Continued)

(58) Field of Classification Search
CPC .......................... B01F 15/024; B01F 13/0062
See application file for complete search history.

(56) References Cited

U.S. PATENT DOCUMENTS

| | | |
|---|---|---|
| 5,175,093 A | 12/1992 | Seifert |
| 6,248,378 B1 | 6/2001 | Ganan-Calvo |

(Continued)

FOREIGN PATENT DOCUMENTS

| | | |
|---|---|---|
| JP | 06-154587 A | 6/1994 |
| WO | WO 2004/002627 A2 | 1/2004 |

(Continued)

OTHER PUBLICATIONS

Machine translation of WO 2010052388 A1, retrieved Aug. 2020. (Year: 2020).*

(Continued)

*Primary Examiner* — Nicole M. Buie-Hatcher
(74) *Attorney, Agent, or Firm* — Leason Ellis LLP

(57) ABSTRACT

A method and apparatus for generating droplets with a high level of uniformity in liquid systems that present a low interfacial tension. This method and apparatus utilize the breakup of the dispersed phase in a controlled fashion by periodically varying the pressure that drives the fluids so as to successfully generate emulsions with a good control over the size. The method and apparatus can be used for the formation of simple emulsion or double emulsion where a larger droplet contains one or more smaller droplets.

7 Claims, 7 Drawing Sheets

Related U.S. Application Data

(60) Provisional application No. 61/611,886, filed on Mar. 16, 2012.

(51) Int. Cl.
  *B01F 15/02* (2006.01)
  *B01F 17/00* (2006.01)
  *G01H 3/04* (2006.01)

(52) U.S. Cl.
  CPC ............ *B01F 15/024* (2013.01); *B01F 17/00* (2013.01); *G01H 3/04* (2013.01)

(56) References Cited

U.S. PATENT DOCUMENTS

| | | | |
|---|---|---|---|
| 6,377,387 B1 * | 4/2002 | Duthaler | B01F 3/0819 264/4 |
| 7,776,927 B2 * | 8/2010 | Chu | B01J 13/14 516/54 |
| 8,070,466 B2 | 12/2011 | Takei | |
| 2005/0058014 A1 | 3/2005 | Komori | |
| 2008/0095705 A1 * | 4/2008 | Virtanen | B01F 15/0203 424/9.1 |
| 2009/0107030 A1 | 4/2009 | Tabata | |
| 2009/0131543 A1 | 5/2009 | Weitz et al. | |
| 2013/0213488 A1 | 8/2013 | Weitz et al. | |

FOREIGN PATENT DOCUMENTS

| | | | |
|---|---|---|---|
| WO | WO 2009/148598 A1 | 12/2009 | |
| WO | WO-2010052388 A1 * | 5/2010 | .......... B01F 11/0258 |

OTHER PUBLICATIONS

Shah et al. "Designer emulsions using microfluidics", Materials Today, 2008, 11(4), 18-27 (Year: 2008).*

Hanson, Chang, Graves, et al, Nanoscale double emulsions stabilized by single-component block copolypeptides, *Nature,* Sep. 4, 2008, vol. 455, pp. 85-88.

Steffen Hardt and Thomas Hahn, Microfluidics with aqueous two-phase systems, *Lap Chip,* 2012, vol. 12, pp. 434-442.

I. Ziemecka, V. van Steijn, G. J. M. Koper, M. Rosso, A. M. Brizard, J. H. van Esch and M. T. Kreutzer, Lab Chip, 2011, vol. 11, pp. 620-624.

Y. H. Choi, Y. S. Song and D. H. Kim, J. Chromatogr., A, 2010, 1217, pp. 3723-3728.

H. Tavana, A. Jovic, B. Mosadegh, Q. Y. Lee, X. Liu, K. E. Luker, G. D. Luker, S. J. Weiss and S. Takayama, Nat. Mater., 2009, vol. 8, pp. 736-741.

D. Lai, Frampton, et al. Rounded multi-level microchannels with orifices made in one exposure enable aqueous two-phase system droplet microfluidics, 2011, vol. 20, p. 3551.

Haas et al, Formation of Uniform Liquid Drops by Application of Vibration to Laminar Jets, Ind. Eng. Chem. Res., 1992, vol. 31, No., pp. 959-967.

Ziemecka, V. van Steijn, G. J. M. Koper, M. T. Kreutzer, and J. H. van Esch, Soft Matter, 7, 9878(2011).

Van Steijn et al., "Monodisperse hydrogel microspheres by forced droplet formation in aqueous two-phase systems", Lab Chip, 2011, 11, 620-624 (published Dec. 1, 2010).

Van Steijn et al, "All-aqueous core-shell droplets produced in a miicrofluidic device", Soft Matter, 2011, 7, 9878-9880 (published Sep. 7, 2011).

* cited by examiner

SYSTEM AND METHOD FOR GENERATION OF EMULSIONS WITH LOW INTERFACIAL TENSION AND MEASURING FREQUENCY VIBRATIONS IN THE SYSTEM

CROSS-REFERENCE TO RELATED PATENT APPLICATIONS

This application is a Divisional Application of U.S. application Ser. No. 13/839,072, filed Mar. 15, 2013 and claims the benefit of priority under 35 U.S.C. Section 119(e) of U.S. Application No. 61/611,886, filed Mar. 16, 2012, all of which are incorporated by reference in their entireties.

FIELD OF THE INVENTION

The present invention relates generally to a system and method for producing simple and double emulsions when the different liquid phases have low interfacial tension and a method for measuring the frequency vibrations used in the system. More specifically, the method relies on pressure fluctuation or perturbation from mechanical vibration and/or electric field modulation to form the single or double emulsions.

BACKGROUND OF THE INVENTION

Emulsions form as a result of many forms of processing and are used extensively by the food, cosmetic and coating industries.

Recent advances in the generation of emulsion droplets have led to further applications in drug delivery and oil extraction. The ability to generate single and multiple emulsions with controlled morphology has allowed for their use in fabricating a variety of functional materials, including microgels and liposomes, which are used for drug delivery; polymersomes used for encapsulating and protecting sensitive molecules, such as drugs, enzymes, other proteins and peptides, and DNA and RNA fragments; and colloidosomes, which are hollow elastic shells whose permeability and elasticity can be precisely controlled. The generality and robustness of colloidosomes makes them a potential candidate for cellular immunoisolation.

Double emulsions can provide advantages over simple emulsions (e.g. oil-in-water, water-in-oil or water-in-water) for encapsulation, such as the ability to carry both polar and non-polar cargos, and improved control over the release of therapeutic molecules. The preparation of double emulsions typically requires mixtures of surfactants for stability and the formation of double nanoemulsions, where both inner and outer droplets are less than 100 nm. However, double nanoemulsions have not yet been achieved in the prior art.

The fluids used in the prior art for the generation of a simple water-in-water emulsion, are combinations of dextran and polyethylene glycol (PEG), or PEG and sodium citrate, or PEG and potassium phosphate, which are characterized by an interfacial tension on the order of 0.1 mN/m. To generate a simple emulsion, the currently used techniques employ a method based on a Polydimethylsiloxane (PDMS) device with a piezoelectric actuator. The piezoelectric actuator is set in a flexible microchannel to bring in the inner fluid (the encapsulated fluid) and a given voltage amplitude together with a well-chosen frequency are used to control the formation of droplets in the outer fluid. An example of this prior art approach can be found in I. Ziemecka, V. van Steijn, G. J. M. Koper, M. Rosso, A. M. Brizard, J. H. van Esch, and M. T. Kreutzer, Lab Chip, 11, 620 (2011), herein incorporated by reference. Additionally, the prior art is directed to a method based on multi-level rounded channels which lead to the generation of simple water-in-water emulsions as described in D. Lai, J. P. Frampton, H. Sriram, and S. Takayama, Lab on a Chip, 20, 3551 (2011) herein incorporated by reference. Furthermore, the prior art has described the application of ultralow surface tension two-phases flow to generate droplets of controlled and uniform diameter with a good production rate. The introduction of a perturbation through a mechanical vibrator has been suggested to produce droplets in air as in P. Haas, ind. Eng. Chem. Res., 31, 959-967 (1992) and Ref: I. Ziemecka, V. van Steijn, G. J. M. Koper, M. T. Kreutzer, and J. H. van Esch, Soft Matter, 7, 9878 (2011) both of which are herein incorporated by reference.

Currently, most of these emulsions contain organic compounds as one of the phases, which compounds are often costly, toxic, flammable and harmful to the environment. The risks of having these compounds in the final structures have led to difficulties in getting them approved for biological applications and internal consumption. Therefore, it is highly desirable to replace the organic solvents with aqueous-based two-phase systems (ATPS) solvents. Nowadays ATPS solvents are widely used for the separation and purification of proteins, antibodies, DNA, cells, cell organelles and even nanoparticles. An all-aqueous emulsion can be generated using ATPS, which forms two immiscible aqueous phases with attractive features, such as their biocompatibility or non-toxicity.

Despite the numerous advantages of ATPS, the use of droplet microfluidic techniques to generate water in water (W/W) emulsions has been limited. One major reason is the low interfacial tension, which prevents the formation of droplets by classical methods. Furthermore, it is a challenge to produce ATPS emulsions in double emulsion form because of the extremely low interfacial tension, even when using microfluidic capillary techniques. Most of the emulsions are made up of two immiscible fluids with an interfacial tension typically of tens of micro Newtons per meter. When the interfacial tension becomes extremely low, typically 100-1000 times lower than the interfacial tension of typical oil-water interfaces, the generation of the emulsion is prevented. The low interfacial tension leads to a reduction in the driving force for liquid jets to break up into droplets by Rayleigh-Plateau instability.

Therefore, what is needed is a method and apparatus that applies perturbation techniques (e.g. mechanical, electrical, etc.) with the formation of simple and double ATPS emulsions where the interfacial tension of both aqueous phases is low.

SUMMARY OF THE INVENTION

The present apparatus and method are directed to use of microfluidic devices to produce simple and double emulsion drops, which are liquid drops suspended in another immiscible liquid. Furthermore, the present invention provides for the creation of simple and double emulsions employing prior art microfluidic devices such as co-flow or flow focusing devices, and generating emulsion droplets between two immiscible phases having a low interfacial tension, sporadically and with a non-uniform droplet size distribution. Another aspect of the present invention is the production of monodisperse emulsions. In particular, the present invention provides for external forcing of the inlet flow at a given frequency to induce the breakup of the jet into droplets of a desired size.

Another object of the present invention is to provide a method for generation of simple emulsion of two immiscible phases with a low interfacial tension when electric fields cannot be used or when the device material is not flexible.

The present invention also provides a method based on pressure perturbation that does not necessitate any alteration of the process of device fabrication. Furthermore, the present invention provides a method for the generation of double emulsions where the different phases have a low interfacial tension, and without the necessity to generate the inner drop using a phase-separation process. Therefore, the present invention allows the direct generation of double emulsions through classical droplet microfluidic approaches, where the species to be encapsulated are separated from the continuous phase by a middle shell phase.

The method and apparatus of the present invention can be applied to generate water-in-water-in-water emulsions (W/W/W). According the present invention, the generation of simple emulsions using two immiscible phases with a low interfacial tension can be achieved by the introduction of a mechanical vibrator connected to the flexible tubing bringing the dispersed phase into the microfluidic device. The generation of double emulsion (W/W/W) using two or more immiscible phases with a low interfacial tension can be achieved by the introduction of a middle phase tubing along with the mechanical vibrator connected to the flexible tubing functioning as the inner capillary of the microfluidic device.

BRIEF DESCRIPTION OF THE DRAWING

The foregoing and other features of the present invention will be more readily apparent from the following detailed description and drawings of an illustrative embodiment of the invention in which.

DETAILED DESCRIPTION OF THE INVENTION

Figure 1:
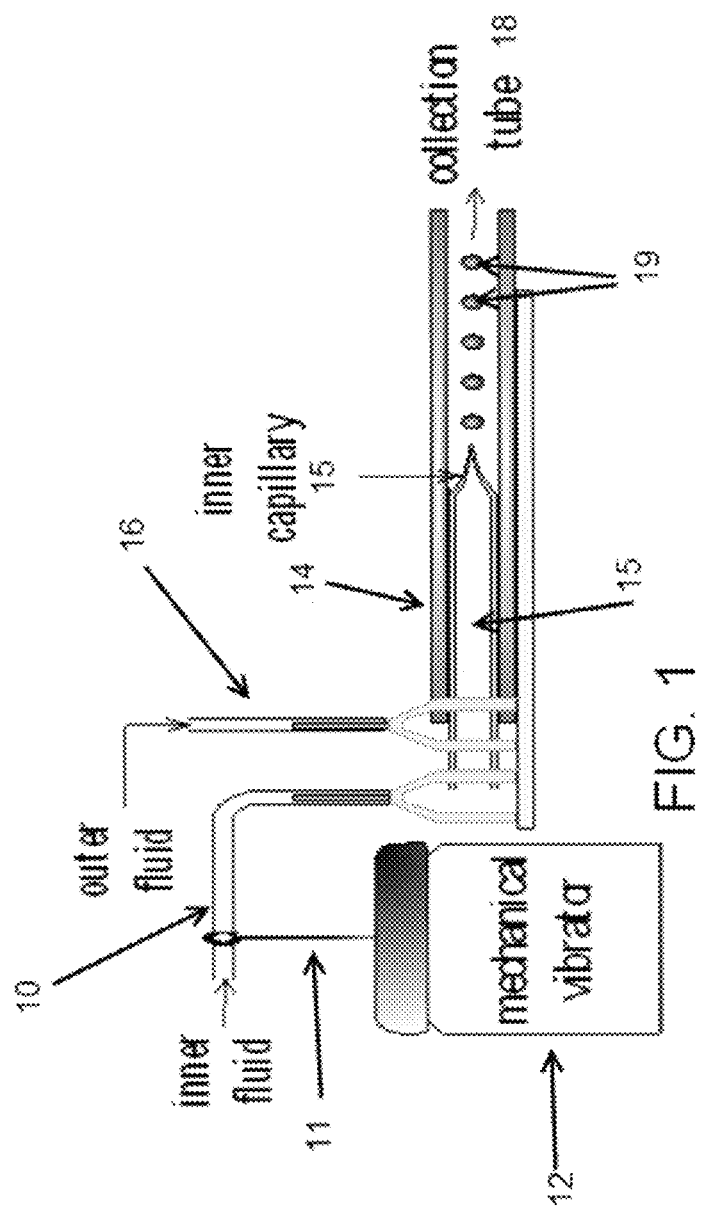
FIG. 1 is a schematic diagram of apparatus forming an illustrative embodiment of the present invention.

By way of overview and introduction, the present invention provides for the formation of an emulsion consisting of droplets of one inner phase aqueous fluid (dispersed phase) in a second immiscible outer or continuous phase fluid. The present invention is also directed at the formation of emulsions incorporating two or more fluids arranged in a more complex structure than a typical two-phase single emulsion. The current method and apparatus provide for a mechanical vibrator connected to an external generator configured to allow low cost and simple production of emulsions by way of mechanical perturbation. Moreover, the present invention provides for an efficient method and apparatus for the encapsulation of material as it provides a way to directly generate water-in-water-in water (W/W/W) double emulsions without using a phase separation method.

The present invention employs two phase fluids to generate simple water-in-water emulsions such as Polysaccharide-Protein Systems (Dextran-gelatin; xanthangum-whey protein; oxidized starch-gelatin; sodium alginate-sodium caseinate; gum Arabic-gelatin; pectin-whey protein; pectin-casein; alginate-caseinate). Alternatively, the present invention provides two fluids to generate simple water-in-water emulsion using Polysaccharide-Polysaccharide Systems (Dextran-dextran sulfate; dextran-hydroxypropyldextran; fiscoll-dextran). In a further alternative arrangement, the present invention is configured to provide two fluids to generate simple water-in-water emulsion using Polyethyleneglycol (PEG)-based Systems (PEG-dextran; PEG-dextran HEMA; PEG-methyacrylated-dextran; PEG-tripotassium phosphate). Additionally, the described system and apparatus is configured to use three-phase fluids to generate water-in-water-in-water double emulsions using Dextran as an inner (or dispersed) and outer phases and Polyethylene Glycol (PEG) as a middle phase.

With respect the invention so described, the generation of all-aqueous simple and double emulsion can be achieved by the use of any aqueous two-phase system (ATPS) using the present method adapted with the present apparatus. The present invention and apparatus includes the introduction of controlled perturbations in the microcapillary devices for simple emulsion generation without perturbing the entire flow. This is achieved by connecting a mechanical vibrator to the flexible tubing that brings the inner fluid into the system.

Additionally, the present apparatus and method are configured to provide the introduction of controlled perturbation in microcapillary devices for double emulsion generation without perturbing the entire flow, which is achieved by connecting two mechanical vibrators. For example, a flexible tubing that brings the inner fluid into the system is vibrated, and another flexible tubing that brings the middle fluid into the system is also subject to vibration. Those skilled in the art will recognize that the vibration generator for the inner fluid and middle fluid can operate in concert or independently of one another.

As seen in FIG. 1, the present invention is directed to a microfluidic device used to produce emulsion drops 19, including liquid drops suspended in another immiscible liquid. The simple emulsion made of two immiscible phases with a low interfacial tension obtained by the method and apparatus described in which the inner phase is mechanically perturbed and controlled for droplet size. The size of the emulsion can be adjusted by tuning the two fluid flow rates and the frequency of perturbation of the inner jet. FIG. 1 provides an inner capillary tube 10 through which an inner fluid flows to an inner channel 15 of the microfluidic device. This tube 10 has an armature 11 of a mechanical vibrator 12 connected to it so as to create mechanical perturbations of the flow of inner fluid through tube 10. The inner fluid in tube 10 flows into the inner channel 15 of the capillary system 14 of microfluidic device. In addition, an outer fluid flows through a capillary tube 16 into an outer channel of the capillary system 14 of the microfluidic device. The forked areas where the outputs of tubes 10, 16 contact the inputs of the channels of the capillary system 14 schematically represent the stubs of syringe needles that are used for connecting the device with syringes for injecting the fluids. Even though the details are not shown, they are arranged so that fluid in tube 10 goes to the inner channel 15 of the capillary system 14 and fluid in tube 16 goes to the outer channel. Within the capillary system of the microfluidic device the inner phase fluid channel 15 is positioned within the outer phase fluid channel so as to form the emulsion at the output tip of inner channel 15. As seen, the tube 10 transporting the inner phase fluid is subject to mechanical perturbations by vibrator 12 prior to its drops being encapsulated by the outer fluid. The result is the generation of encapsulated drops 19 at the output or tip of the inner channel 15 of the capillary system 14 of microfluidic device. These drops are directed to a collection tube 18.

The controlled droplets of the present invention are micrometer in scale and are formed by the applied perturbation of the tube 10. The inner capillary apparatus 15 is made up of two coaxially aligned capillary tubes. The inner capillary tube is cylindrical, with a tip of approximately 30 µm. However, those reasonably skilled in the art would appreciate the different values applicable to the present device and apparatus. The outer capillary is square, with an inner dimension of 1 mm. The coaxial alignment of the capillaries is ensured by matching the outer diameter of the inner capillary to the inner dimension of the square capillary. The two flexible tubes 10, 16 bring the inner and outer fluids in the capillaries at the flow rates Qin and Qout, respectively. For example, the inner phase can be an aqueous solution of polyethylene glycol (PEG, MW=8000, 17% wt) and the outer phase an aqueous solution of dextran (T-500, MW=500 000, 15% wt), which results in two distinct immiscible phases. Therefore, the interfacial tension between the two phases is low, about 0.1 mN/m.

As noted above, the mechanical vibrator 12 connected to the tube 10 agitates the inner fluid. The vibrator is controlled by an external generator that tunes the frequency in the range [0.1; 5000] Hz with a sinusoidal variation. However, those skilled in the art will recognize that other frequencies and wave forms are also applicable to the present invention under different conditions. The lack of vibration of the tip or outlet of the inner capillary 15 ensures that the effect induced by the mechanical vibrator 12 is only due to variations of the pressure at the imposed frequency. As a result, the apparatus enables precise control of the frequency of the pressure perturbation, which allows for precise control over the dimensions of the droplets 19 and their characteristics, given a specific flow rate of the outer and inner phases. In an alternative arrangement of the invention, the flexible tube 10 directs the inner fluid into a capillary microfluidic device (not shown) which is connected to a mechanical vibrator that induces a controlled pressure variation at the entrance of the inner capillary 15.

Figure 2:
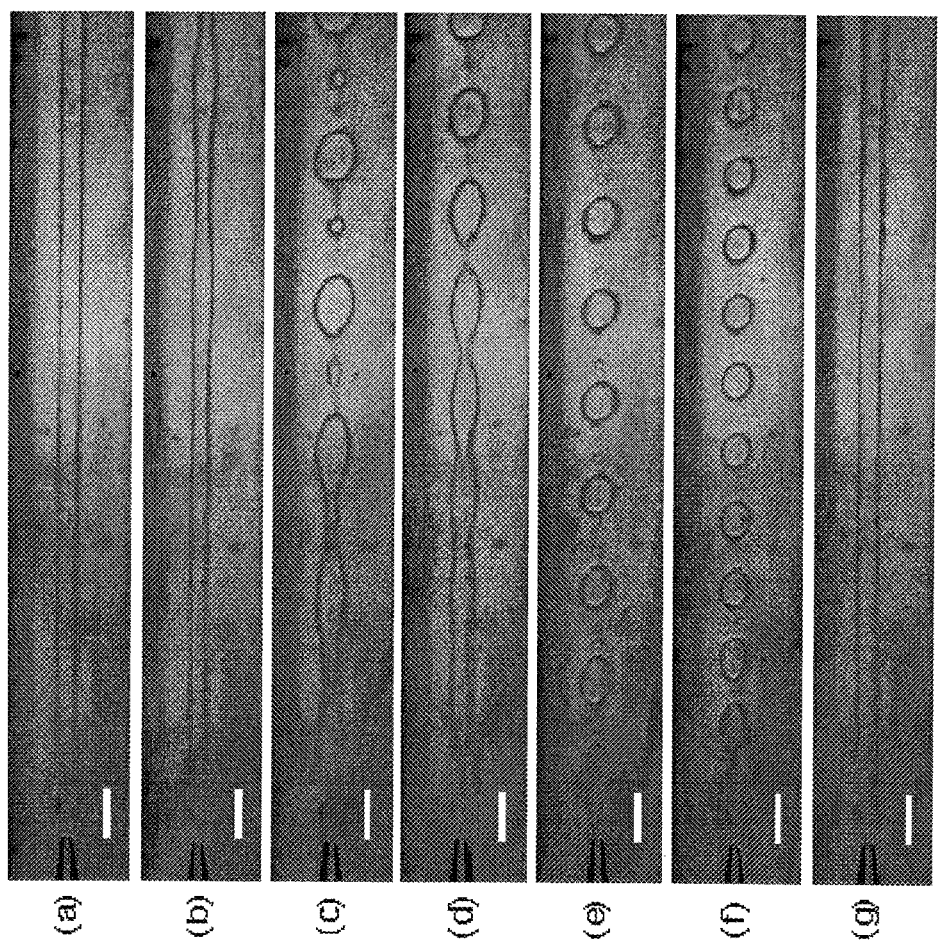
FIGS. 2(a) to 2(g) are a series of images demonstrating the production of simple emulsions using the apparatus of FIG. 1 with different frequencies of perturbations.

As seen in FIG. 2, a microcapillary device for double emulsion generation is used to obtain simple emulsions. In the given illustration, the inner phase and outer phase is an aqueous solution of dextran (T-500, MW=500 000, 15% wt). The middle phase is an aqueous solution of polyethylene glycol (PEG, MW=8000, 17% wt). As in FIG. 1, a mechanical vibrator is connected to the tubing for injecting the inner fluid. By tuning the frequency of perturbation as well as the flow rates of the different phases, all-aqueous double emulsions with different size can be obtained and the number of encapsulated droplets can be controlled (See also FIG. 4). The inner phase, in the illustrated embodiment is an aqueous solution of polyethylene glycol (PEG, MW=8000, 17% wt) and the outer phase is an aqueous solution of dextran (T-500, MW=500 000, 15% wt). The interfacial tension between the two phases is low, about 0.1 mN/m.

Figure 3:
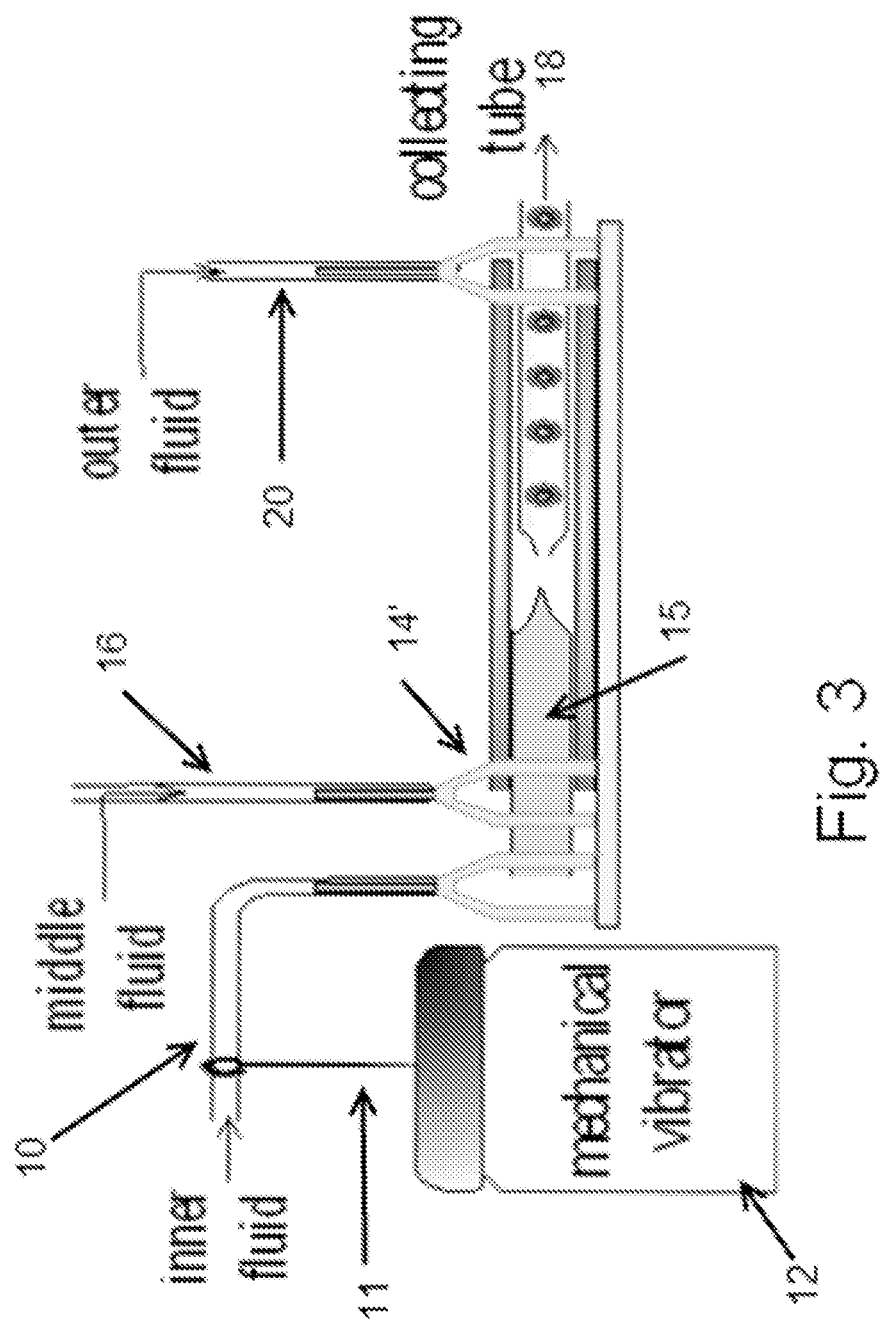
FIG. 3 is a schematic diagram of apparatus illustrating an alternative embodiment of the present invention used to generate double emulsions.

The microfluidic device of FIG. 3 is similar to the device of FIG. 1 but accommodates a middle fluid so as to be capable of forming a W/W/W double emulsion. As shown in FIG. 3 the device includes at least two capillary tubes 10, 16 (same as in FIG. 1). Additionally, the arrangement includes another capillary tube 20. The microfluid device 14' includes two coaxially aligned channels, a cylindrical inner channel 15, with an approximate output tip diameter of 30 µm, coaxially inserted in a square outer channel, with an inner dimension of 1 mm. The two flexible tubes 10, 16 bring the inner fluid and a middle fluid into the channels of the microfluidic device 14' at the flow rates Qin and Qmid, respectively. A mechanical vibrator 12 (such as PASCO Model SF-9324) is connected to the tubing 10 which injects the inner fluid. The vibrator is controlled by an external generator for tuning the frequency in the range of 0.1 to 5000 Hz with a sinusoidal waveform. By tuning the frequency of perturbation, a monodisperse emulsion is obtained as seen in FIG. 2.

Furthermore, different flow regimes are created as a function of the frequency of the perturbations. For example, in one embodiment of the invention the inner and outer fluid flow rates are, respectively, Qin=50 µL/h and Qout=5000 µL/h. Under these conditions, in the absence of external force the emulsions of FIG. 2 are created wherein for (a) f=0 Hz. For (b) f=3 Hz, for (c) f=4 Hz, for (d) f=6 Hz, for (e) f=7 Hz, for (f) f=8 Hz, and for (g) f=10 Hz (scale bars are 200 µm). The scale bar is 100 µm and the resulting jet regimes are shown in FIG. 2(a) to FIG. 2(g). In an alternative embodiment, the two immiscible phases are taken as polyethylene glycol (PEG, MW=8000, 17% wt) for the outer phase and an aqueous solution of K3PO4 (15% wt) for the dispersed phase.

As further seen in FIG. 3, the fabrication of controlled W/W (water/water) emulsions can be adapted for the formation of W/W/W double emulsions using a modified glass microcapillary device 14'. The double emulsion is made of two or more immiscible phases with a low interfacial tension. The number of encapsulated droplets as well as the size of the outer and inner droplets can be controlled by adjusting the different flow rates as well as the frequency of the mechanical vibrator. In the illustrated embodiment, an aqueous PEG solution forms the middle phase introduced to the capillary device 14' through tube 16, while an aqueous dextran solution forms both the inner phase from inner fluid introduced through tube 10 and outer phases from an outer fluid introduced to microfluidic device 14' through tube 20. Fluid from tube 20 passes through a channel in the microfluidic device from the opposite direction as the flow in the inner channel 15 and the outer channel, and passes about a collection tube 18 as shown in FIG. 5. The interaction of the fluid flows is such that the inner fluid is encapsulated by fluid flowing in the middle fluid channel and the middle fluid is encapsulated by the outer fluid. The mechanical vibrator 12 is connected to the inner plastic tubing 10 as in the formation of simple W/W emulsion. By tuning the frequency and the amplitude of pressure perturbation as well as the flow rates of both phases, control can be exercised over the size of the inner droplets and the number of the inner droplets encapsulated in the middle fluid as demonstrated in FIG. 4. In an alternative embodiment an additional mechanical vibrator (not shown) is coupled to the tubing 16 directing the middle phase liquid. The use of two perturbations allows for the generation of double emulsions whose properties can be defined as a function of flow rate and vibration frequency.

Figure 4:
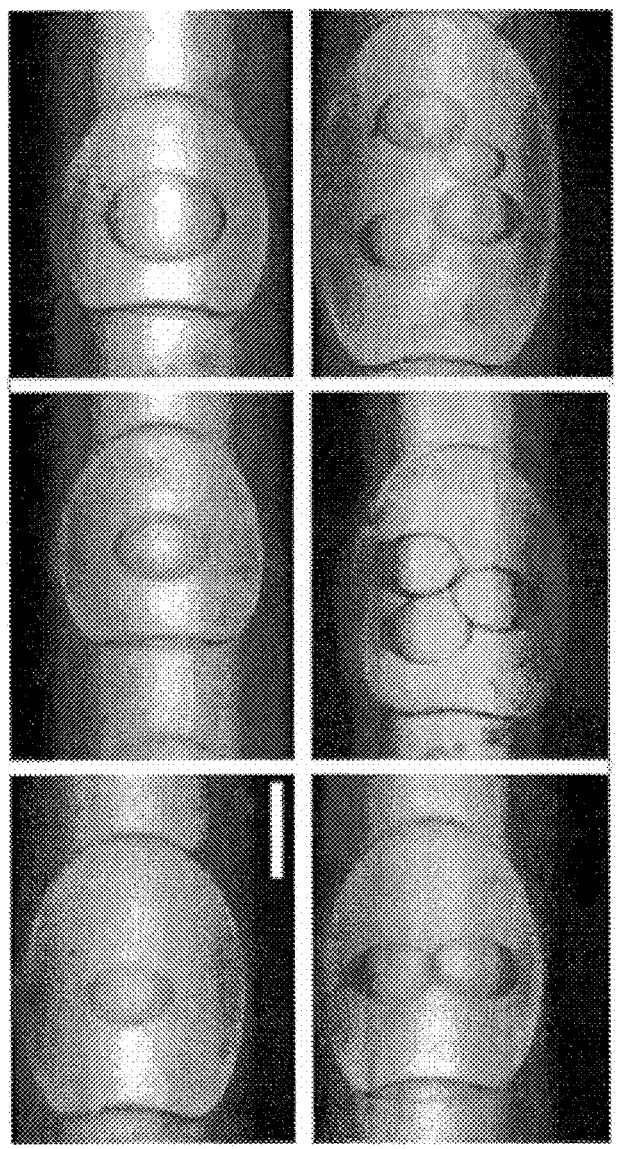
FIG. 4 is a series of images illustrating the production of double emulsions using the apparatus of FIG. 3.
Figure 5:
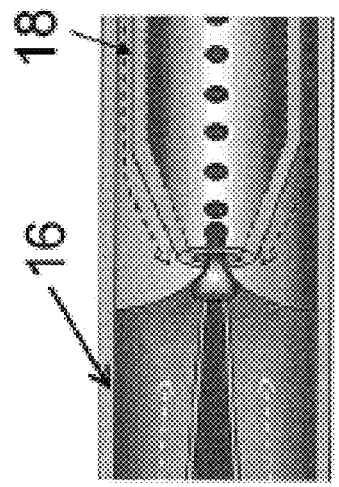
FIG. 5 is a schematic diagram of a set up for generation of a double emulsion in a microfluidic device according to the present invention.

As seen in FIG. 4, the present invention provides a method of using mechanical perturbations to form both water-in-water and water-in-water-in-water emulsions. The method described provides an advantage in generating all-aqueous emulsions by broadening the range of droplets that the microfluidic techniques typically can generate from oil-water-based liquid-liquid systems to all-aqueous systems. Additionally, the present invention achieves the generation of the droplets by applying the perturbations to the tubing in which the fluids for injection into the devices flow, without modifying the design of the devices currently used in the art. Therefore, the approach provided by the present method and apparatus are configured to be easily incorporated into current droplet mass production devices.

FIG. 5 is a schematic of the setup for the generation of a double emulsion in a microfluidic device. The flexible tubing 15 directs the inner fluid 30 into the capillary microfluidic device 14' and is connected to a mechanical vibrator (not shown) that induces controlled pressure variation at the entrance of the inner capillary. An additional vibrator is used to provide pressure variation for the middle fluid 33 to achieve controlled generation of double emulsion drops 31 located within the outer fluid 35.

Figure 6:
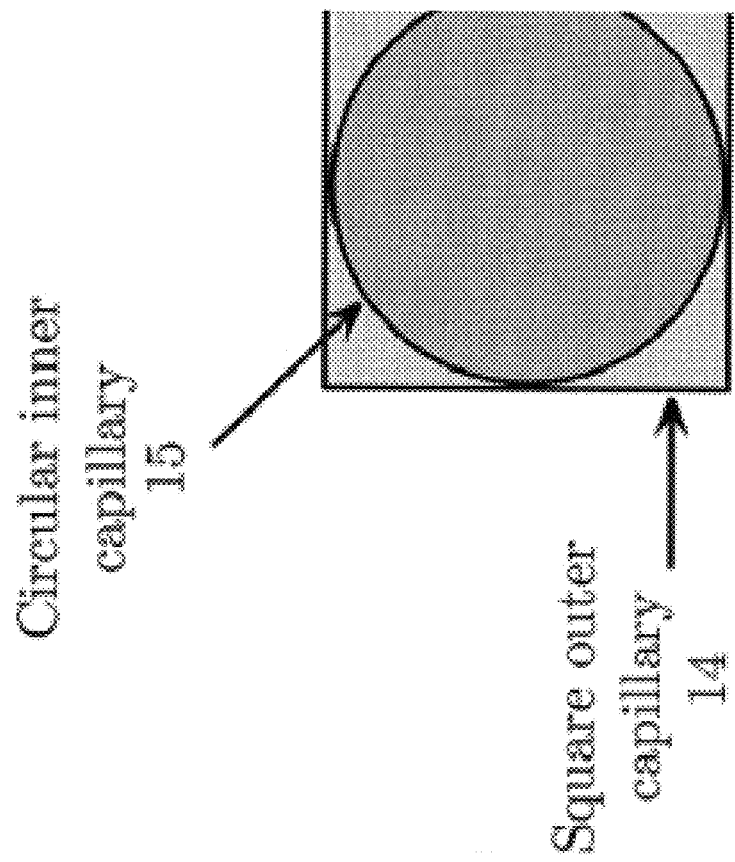
FIG. 6 is a schematic diagram showing the relative orientations of a square outer capillary to a circular inner capillary according to the present invention.

In an alternative arrangement of elements, as seen in FIG. 6, the relative orientations of the square outer capillary (tubing) 14 relative to the circular inner capillary (tubing) 15 is such that the fluid flow is not impeded through the outer capillary. In this way, the dimensions of both the inner and outer capillaries can be optimized to allow the maximum amount of inner fluid relative to the outer fluid.

As an alternative to fabricating a double emulsion by utilizing the previously described technique, a single emulsion may first be produced by mechanical vibration, followed by triggering a third phase inside the single emulsion.

Figure 7A:
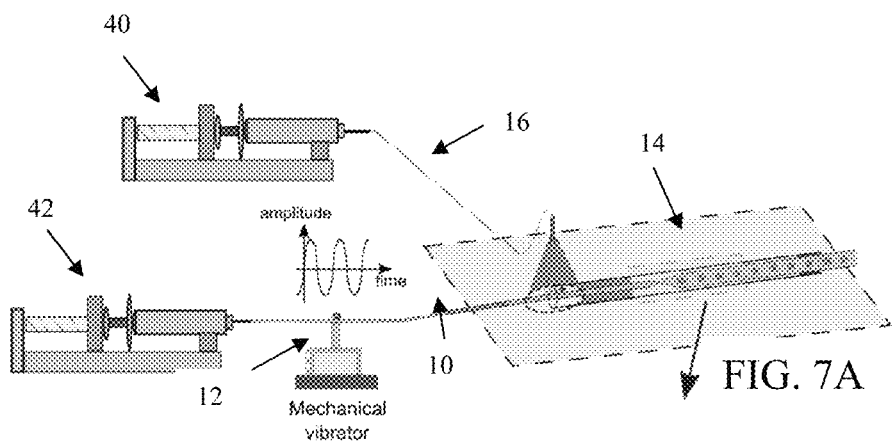
FIG. 7A is a schematic diagram of apparatus for the formation of a double emulsion by triggering phase separation inside a single emulsion.
Figure 7B:
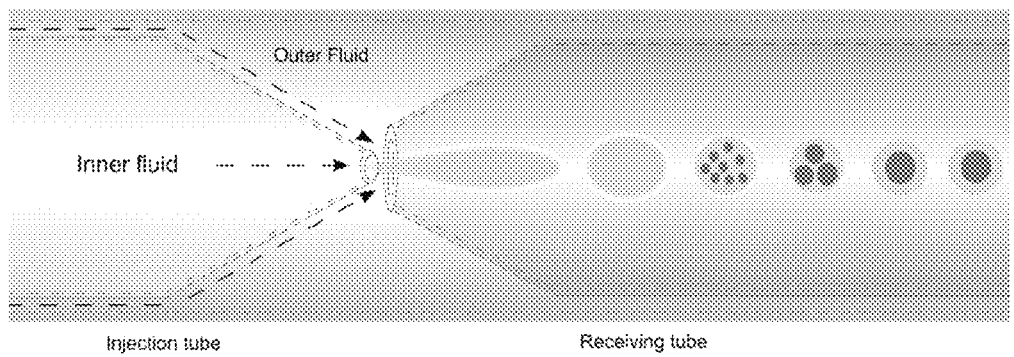
FIG. 7B is an enlarged schematic of the microfluidic device in FIG. 7A.

The third phase could be triggered by extracting water from the inner fluid that contains two or multiple incompatible solutes. Therefore, when the concentration of the incompatible solutes increases upon extraction of water, the originally miscible inner fluid separates into one or more immiscible phase(s). The apparatus of FIG. 7 shows this. In FIG. 7A a fluid injector 40 injects the outer fluid into tube 16, which in turn injects it into the capillary system 14 of the microfluidic device. The details of this embodiment of the capillary system 14 are shown in FIG. 7B. A second fluid injector 42 injects the inner fluid into tube 10, which is subject to vibrations by mechanical vibrator 12, typically in sinusoidal fashion as shown in FIG. 7A. Fluid in tube 10 enters the capillary system 14 as the inner fluid as shown in FIG. 7B. With this arrangement, for example, the inner phase fluid could be a solution that is a mixture of 5 wt % dextran (Mw=500,000) and 1% PEG (Mw=8000). The outer phase or fluid could be 8 wt % PEG (Mw=8000). By applying vibrations to the inner tubing, the inner fluid phase breaks up into a single emulsion. To balance the osmosis pressure, the inner phase loses water and separates a liquid core from the original single emulsion. The schematic in FIG. 7B illustrates the formation of a double emulsion by inducing a phase separation inside the single emulsion template.

Figure 8:
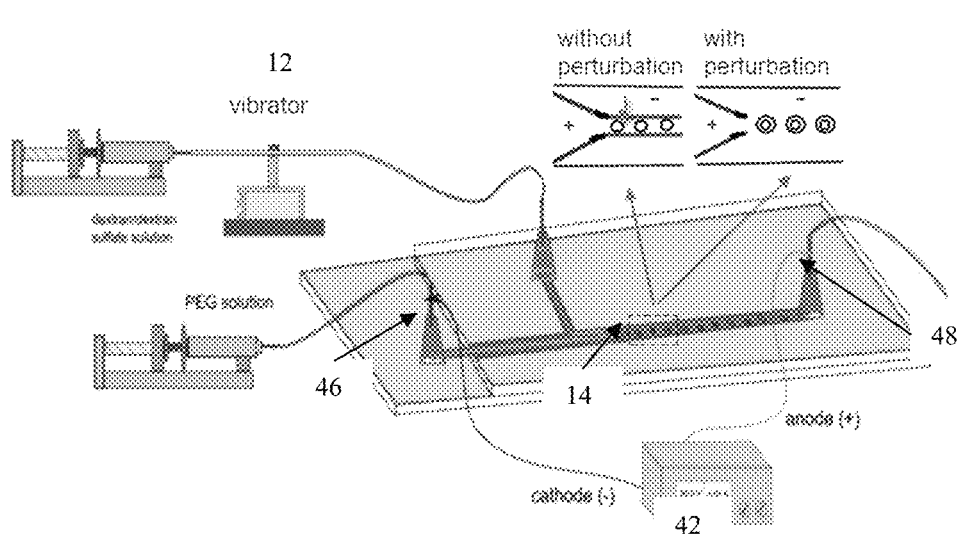
FIG. 8 is a schematic diagram of apparatus for the formation of a double emulsion by perturbation and electrophoresis.

The third phase could also be triggered by forcing an outer fluid solution that contains charged solutes or macromolecules to migrate into the inner fluid under an electrical field (e.g. D.C.), as shown in FIG. 8. For example, the inner phase is 10 wt % PEG solution, and the outer phase is a mixture of 10 wt % dextran (Mw=500,000) solution and 10 wt % dextran sulfate (Mw=500,000) solution. The inner and outer phase fluids are oppositely charged by connecting the structures 46, 48 of the capillary system 14 for each fluid to a direct current power supply 42 set at 200 volts. After charging, dextran sulfate in the outer phase migrates into the inner phase under the electrostatic force, forming an immiscible phase inside the PEG solution. By vibrating the tubing of the outer phase with vibrator 12, the inner phase of the PEG solution breaks up with the triggered phase and forms double emulsion, shown schematically in FIG. 8. Both examples take advantage of the pressure vibration approach to generate double emulsion, thus they are modifications of the general principles of the present invention.

The all-aqueous emulsions can be used as liquid templates to synthesize materials with controllable sizes, such as particles and capsules. The size of these particles and microspheres depends on the size of the emulsion. The methods to synthesize these materials include evaporation of water solvent, polymerization of monomer solutions, or gelation of the liquid phases. For example, the emulsion phase could be water with polyethylene glycol diacrylate (PEGDA, Mw=700, 40 wt %), and the continuous phase could be water with 15 wt % potassium phosphate. The flow rate of the emulsion phase and continuous phases could be 20 ul/h and 1000 μl/h, respectively. When the perturbation frequency of the emulsion phase is 4 Hz, emulsion droplets with a diameter of 138 μm form. By irradiating these droplets with ultraviolet light of appropriate wavelength (e.g. 255 nm) for a certain period of time (e.g. 10 seconds), the emulsion drops solidify into hydrogel particles with a diameter dictated by that of the emulsion droplet precursors. Capsules with controllable sizes can be fabricated by solidifying or gelating the shell phase of W/W/W double emulsions generated using this invention. The middle phase could be PEGDA, or other hydrogels, and the emulsion and continuous phases could be water with dextran. The size of the capsule depends on the dimension of the double emulsion.

Figure 9:
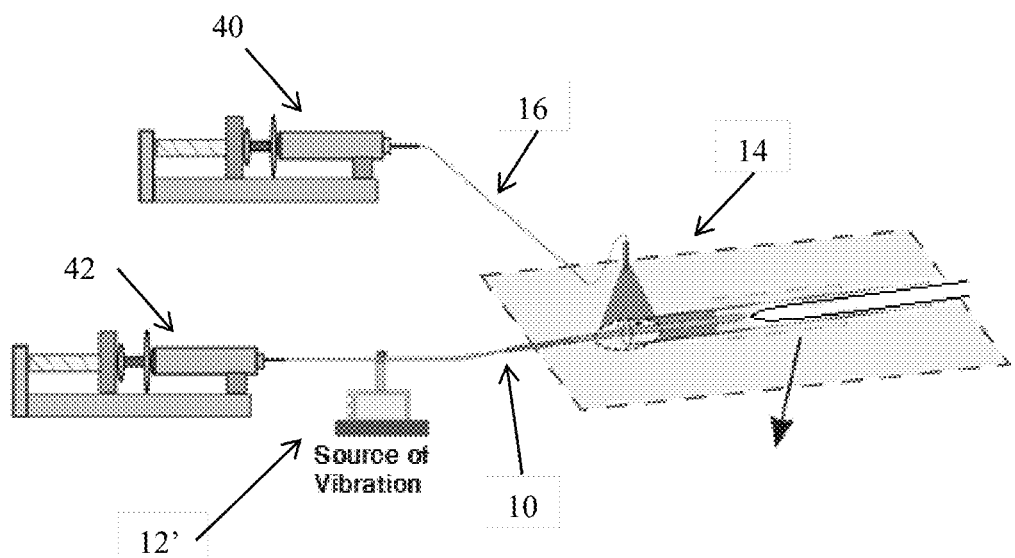
FIG. 9 is a schematic diagram of apparatus for carrying out a method for determining the vibration frequency used to create a particular emulsion according to the present invention.

With a setup and system similar to that in FIG. 7, where the interfacial tension is low, a method according to another aspect of the invention allows for the measurement of the frequency of vibrations that created a particular emulsion. As seen in FIG. 9, compared with FIG. 7, the mechanical vibrator is replaced with a vibrating source 12' whose vibration is to be detected. When the flow rate of the inner flow is larger and the interface forms a diverging profile, by observing the deformation of the interface, it is possible to determine the perturbation that is applied to the inner flow. Interfacial tension is important in this method because higher interfacial tension will suppress the deformation, while lower interfacial tension helps to magnify the perturbation and gives larger deformation.

Figure 10:
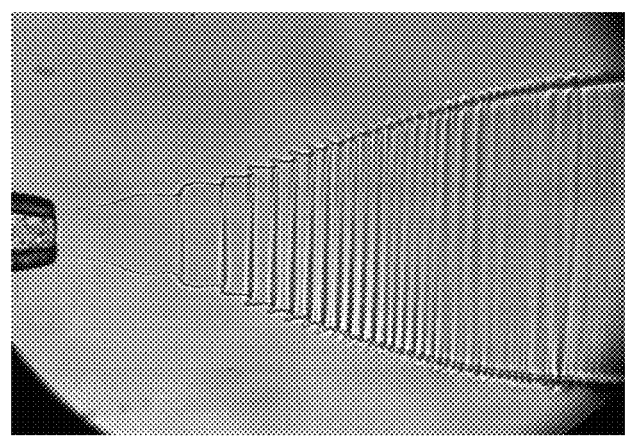
FIG. 10 is a photograph of a two-phase flow created by the apparatus of FIG. 9.

The interface is shown in FIG. 10, where the scale bar is 100 μm. As can be seen in FIG. 10, the inner fluid flows out from the nozzle and meets the outer fluid, which flows in the square capillary. (The wall of square outer capillary is not shown in FIG. 10.) Then the flow of the two fluids forms the interface. Because of the perturbation that is applied to the inner flow, the interface deforms and provides regular ripples. Thus, the perturbation is manifested in the emulsion. Assuming there is no good way to measure the frequency of the vibration source; this method is a straightforward way to do it. Simply by changing the flow rates to appropriate values, the corresponding frequency of the perturbation can be measured on the interface. The agreement between the applied and measured frequencies confirms that the perturbation is indeed the source of the ripples on the interface. In addition, in the absence of a vibrator capable of generating precisely controlled frequencies, the observed frequency can easily be measured and/or set using image analysis.

In an example the diameter of the device's nozzle is 45 µm, and the square outer capillary's dimension is 1 mm×1 mm. A perturbation whose frequency is 500 Hz is applied to the inner tube. When Qin=6 mL/h and Qout=8 mL/h, it can be observed in FIG. 10, that ripples appear in the fluid. The frequency of the ripples, which in FIG. 10 is 500 Hz, corresponds to the vibration frequency. Thus the perturbation that is applied to the tubing with a low interfacial tension system is manifested in the emulsion.

It should be understood that various combination, alternatives and modifications of the present invention could be devised by those skilled in the art. The present invention is intended to embrace all such alternatives, modifications and variances that fall within the scope of the appended claims.

While the invention has been particularly shown and described with reference to a preferred embodiment thereof, it will be understood by those skilled in the art that various changes in form and details may be made therein without departing from the spirit and scope of the invention.

We claim:

1. A device for producing an all-aqueous double emulsion containing two or more immiscible aqueous phases comprising:
    a microfluidic device;
    an outer fluid capillary connected to an outer channel of the microfluidic device and directing an outer fluid thereto;
    an inner fluid capillary connected to an inner channel of the microfluidic device and directing an inner fluid thereto, wherein the inner fluid channel is located within the outer fluid channel of the microfluidic device and wherein the inner channel is further configured to direct fluid flowing in the inner channel into the fluid flowing in the outer channel through an outlet of the inner channel; and
    a mechanical vibrator, wherein the mechanical vibrator is configured to mechanically perturb the inner fluid capillary at a point prior to the outlet of the inner fluid capillary and the input to the inner channel of the microfluidic device so as to introduce controlled perturbations in the microcapillary device without perturbing the entire flow.

2. The device for producing an all-aqueous double emulsion as claimed in claim 1 further including;
    a middle fluid capillary connected to a middle channel of the microfluidic device and directing a middle fluid thereto, wherein the middle channel is disposed between the inner and outer channels, the middle fluid channel being configured such that the fluid directed through the inner channel outlet is directed into middle fluid such that the inner fluid is encapsulated by the middle fluid and the middle fluid is encapsulated by the outer fluid.

3. The device for producing an all-aqueous double emulsion of claim 2 wherein a second mechanical vibrator is connected to the middle fluid capillary.

4. A device for producing a double emulsion containing two or more immiscible aqueous phases comprising:
    a microfluidic device;
    an outer fluid capillary configured to direct an outer fluid to an outer channel of the microfluidic device;
    an inner fluid capillary configured to direct an inner fluid to an inner channel of the microfluidic device located within the outer fluid channel of the microfluidic device and further configured to direct the inner fluid flowing in the inner fluid channel into the outer fluid flowing in the outer channel through an outlet to the outer channel;
    a mechanical vibrator, wherein the mechanical vibrator is configured to mechanically perturb the inner capillary at a point prior to the outlet of the inner capillary so as to introduce controlled perturbations in the microcapillary device without perturbing the entire flow, whereby a single emulsion is created within the microfluidic device; and
    a liquid extractor which triggers a third phase inside the single emulsion when the inner fluid contains two or more incompatible solutes, by extracting water from the inner fluid so that the concentration of the incompatible solutes increases until the inner fluid separates into one or more immiscible phases.

5. The device of claim 4 wherein the inner fluid is a mixture of about 5 wt % dextran (Mw=500,000) and about 1% PEG (Mw=8000), and the outer fluid is about 8 wt % PEG (Mw=8000).

6. A device for the production a double emulsion containing two or more immiscible aqueous phases comprising:
    a microfluidic device;
    an outer fluid capillary configured to direct an outer fluid into an outer channel of the microfluidic device;
    an inner fluid capillary configured to direct an inner fluid into an inner channel of the microfluidic device, said inner channel being located within the outer fluid channel of the microfluidic device and further configured to direct an inner fluid flowing in the inner fluid channel into the outer fluid flowing in the outer fluid channel through an outlet of the inner channel;
    a mechanical vibrator, wherein the mechanical vibrator is configured to mechanically perturb the inner capillary at a point prior to the outlet of the capillary so as to introduce controlled perturbations in the microcapillary device without perturbing the entire flow; and
    a power supply that oppositely charges the inner and outer fluids so that the outer fluid migrates into the inner fluid under electrostatic force, forming an immiscible phase inside the outer fluid.

7. The device of claim 6 wherein the inner fluid is about 10 wt % PEG solution, and the outer fluid is a mixture of about 10 wt % dextran (Mw=500,000) solution and about 10 wt % dextran sulfate (Mw=500,000), and wherein the power supply is set at about 200 volts, whereby, vibrating the outer capillary causes the inner fluid of PEG solution to break up into one or more immiscible phases and form a double emulsion.

* * * * *